July 2, 1957 J. H. GRIFFITH ET AL 2,797,502
SNOW PLOW ATTACHMENT FOR ROTARY POWER MOWERS
Filed Feb. 9, 1956 3 Sheets-Sheet 1

John H. Griffith
Ronald G. Packett
INVENTORS

BY *C. A. Snow & Co.*
ATTORNEYS.

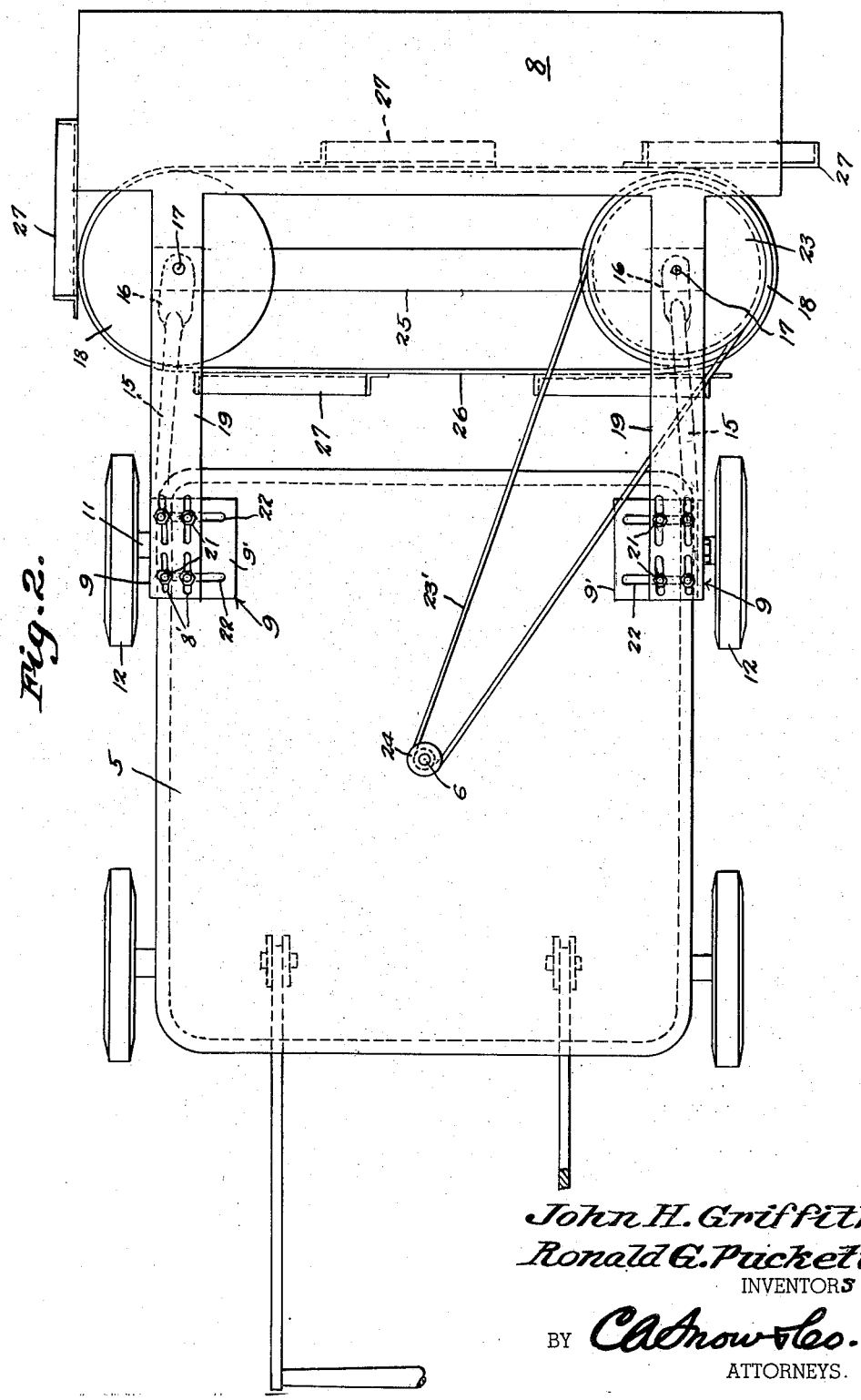

July 2, 1957  J. H. GRIFFITH ET AL  2,797,502
SNOW PLOW ATTACHMENT FOR ROTARY POWER MOWERS
Filed Feb. 9, 1956  3 Sheets-Sheet 3
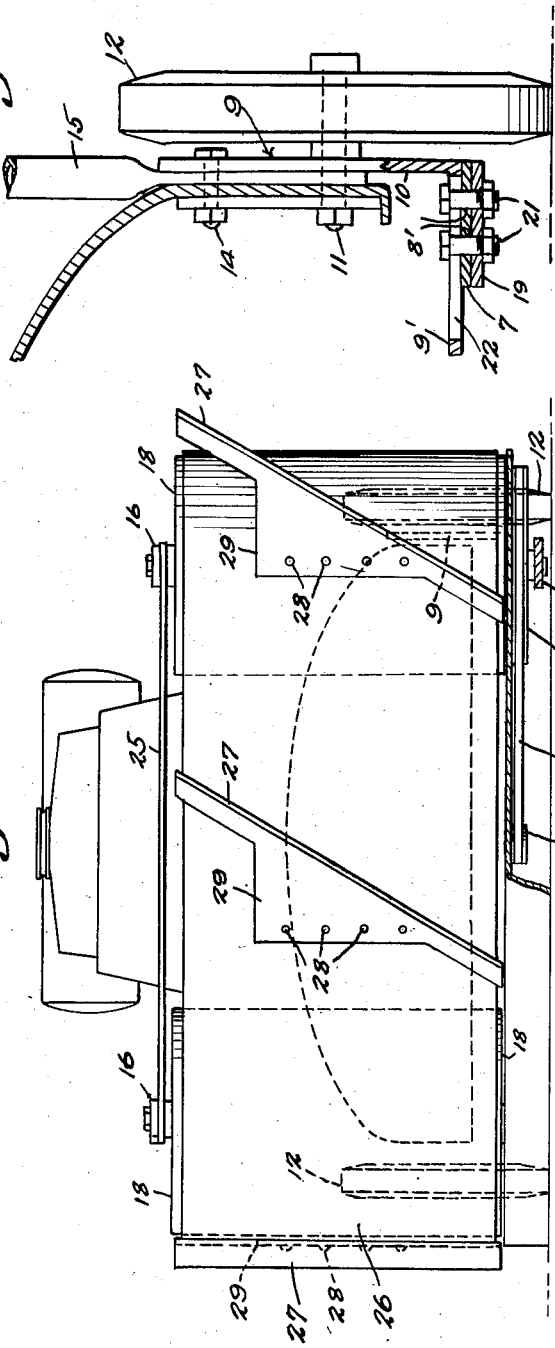
John H. Griffith
Ronald G. Puckett
INVENTORS.
BY C. A. Snow & Co.
ATTORNEYS.

United States Patent Office 2,797,502
Patented July 2, 1957

2,797,502

SNOW PLOW ATTACHMENT FOR ROTARY POWER MOWERS

John H. Griffith and Ronald G. Puckett, Olathe, Kans.

Application February 9, 1956, Serial No. 564,408

6 Claims. (Cl. 37—45)

This invention relates to a snow plow attachment designed for use in connection with motor lawn mowers of the type employing a vertical power shaft on which the cutter blades are mounted.

An important object of the invention is to provide a snow plow attachment which may be readily and easily mounted on the frame of a power mower, with means to take off power from the power shaft thereof for operating the belt supported snow removing blades of the attachment.

Another object of the invention is to provide an attachment which is adjustable so that it may be adapted for use on lawn mowers of various widths and constructions.

Still another object of the invention is to provide a snow plow wherein the snow removing blades thereof are carried by an endless belt which operates transversely of the path of travel of the machine, to the end that the snow is removed from the path of travel of the machine, and deposited laterally thereof.

Other and further objects and advantages of the invention will be hereinafter described and the novel features thereof defined in the appended claims.

Referring to the drawings:

Fig. 2 is a bottom view thereof.

Fig. 3 is a front elevational view of the attachment as mounted on the frame of a power lawn mower, a portion of the scraping blade of the attachment having been removed.

Fig. 4 is a fragmental detail sectional view illustrating the connection between the supporting arms of the attachment, and the frame of the motor mower.

Fig. 5 is a perspective view of one of the brackets employed in mounting the attachment.

Fig. 6 is a fragmental perspective view of the rearward end of one of the supporting arms of the attachment frame.

Fig. 7 is a perspective view of the rear end of one of the supporting arms of the attachment frame.

Figure 1:
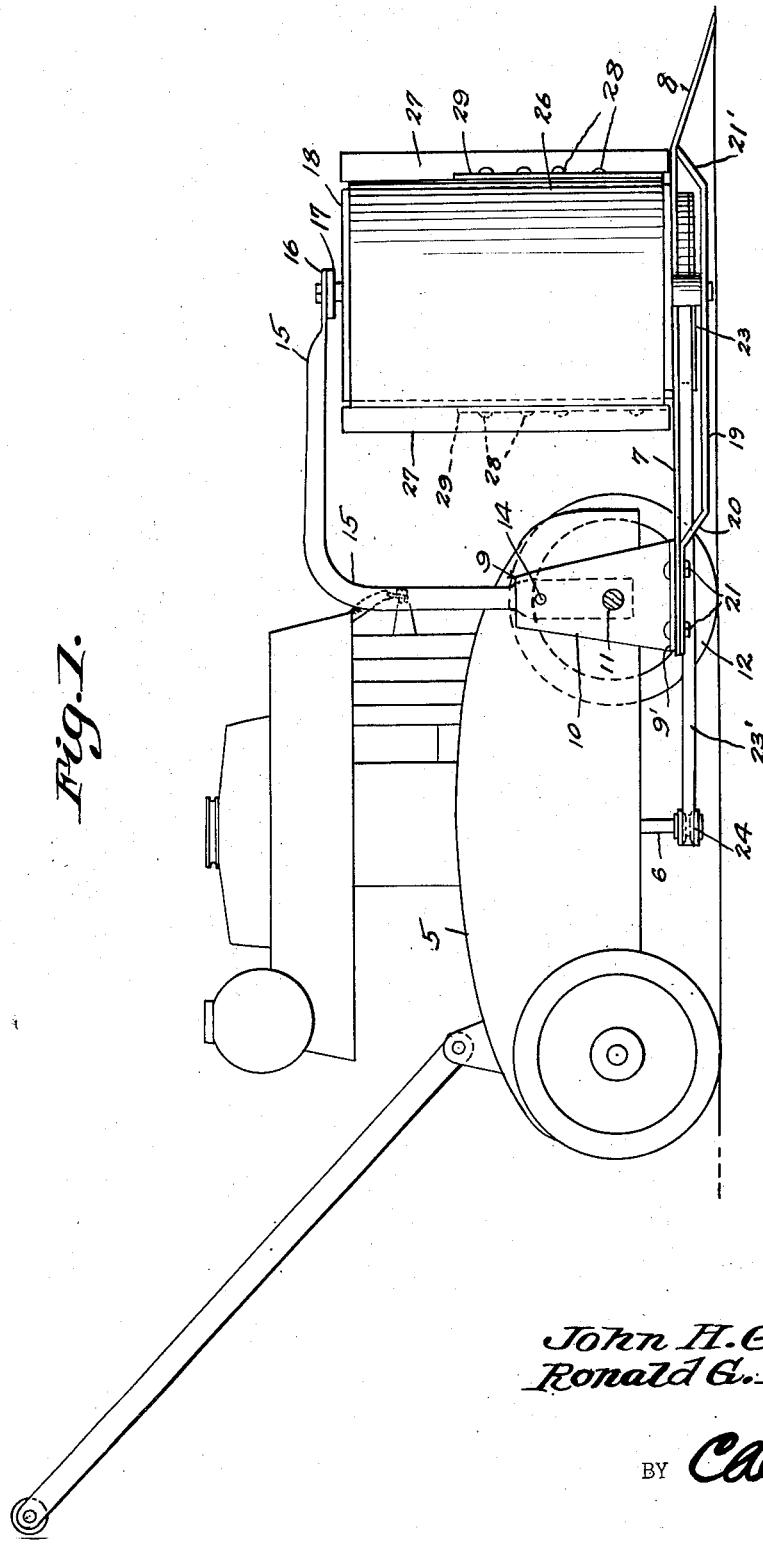
Fig. 1 is a side elevational view of a power operated lawn mower, equipped with an attachment constructed in accordance with the invention.

Referring to the drawings in detail, a motor operated mower of the type embodying a vertical power shaft, is indicated generally by the reference character 5, the power shaft of the mower and which supports the usual rotary cutting blades of the mower, is indicated by the reference character 6.

The attachment forming the subject matter of the present invention, comprises wide arms 7 that extend laterally from one edge of the scraper blade 8, the arms 7 having openings 8' that are elongated longitudinally of said arms 7 as shown by Fig. 2 of the drawings. The blade 8 is substantially wide and is of a length to extend a substantial distance beyond the side edges of the mower frame to which the attachment frame is connected.

Brackets 9 are formed with horizontal sections 9' and vertical sections 10, the vertical sections 10 having openings 10' that receive shafts 11 on which the wheels 12 at the forward end of the mower are mounted. The brackets are also provided with openings 13 that accommodate bolts 14 which connect the brackets 9 to the frame of the machine.

The bolts 14 also extend through openings formed in the lower ends of the forwardly extended arms 15, which arms 15 are provided with flattened forward ends 16, which flattened ends 16 are formed with openings to receive the upper ends of the shafts 17 on which the drums or pulleys 18 are mounted, the lower ends of the shafts 17 being mounted in bearing openings formed in the arms 7. To further brace the frame of the attachment, arms 19 are provided that also have bearing openings in which the lower ends of said shafts 17 operate. The arms 19 have upwardly extended rear ends 20 that are bolted to the brackets 9 by bolts 21 that pass through elongated openings 22 formed in the lower horizontal sections 9' of the brackets, as best shown by Fig. 1 of the drawings.

These openings 22 permit the arms 7 and 19 to be adjusted laterally for width in adapting the attachment for positioning on mowers of various widths.

The forward ends of these arms 19 extend upwardly at 21' where they contact the scraper blade 8 to further support the frame of the snow plow attachment.

The lower end of the shaft 17 carries a pulley 23 over which the belt 23' operates, the belt 23' also operating over pulley 24 which is attached to the power shaft 6 as a replacement for the cutter blades normally mounted on the lower end of this power shaft 6.

The rear ends of arms 19 are provided with elongated openings 24' that accommodate the bolts 21 that extend through the elongated openings 8' of arms 7 so that the arms 19 and 7 may be adjusted to permit the snow plow attachment to be secured to motor mowers of various sizes.

A transversely disposed bar 25 also provides a part of the frame of the attachment, the ends of which extend to points directly above the drums or pulleys 18, the bar 25 being provided with openings to accommodate the upper ends of shafts 17. This bar 25 provides means for maintaining the shafts of the drums or pulleys in upright positions.

The wide belt indicated by the reference character 26 operates over the drums or pulleys 18, and carries the inclined blades 27 that are secured to the wide belt by means of rivets 28.

Blades 27 are provided with substantially wide intermediate sections 29 which are secured to the belt, the major portions of the blades extending beyond the ends of the sections 29 so that the blades will not interfere with the operation of the machine when the belt moves around the drums or pulleys 18, during the operation of the attachment.

From the foregoing it will be seen that due to the construction shown and described, we have provided an attachment which may be readily and easily bolted to the forward end of a power operated mower, the attachment comprising an endless belt operating in a horizontal plane, with its side faces disposed vertically, causing the inclined blades which contact the snow, to move the snow laterally, as the machine is moved forwardly.

It will also be noted that power is taken off from the power shaft of the mower for the operation of the belt and blades, thereby providing a snow plow scraper which is power operated.

Having thus described the invention, what is claimed is:

1. The combination with a motor mower and the vertical power shaft thereof, of a snow plow attachment comprising a frame, mechanism for removably attaching said snow plow attachment to the frame of the power mower, vertical drums mounted on the frame of said attachment at the front thereof, said drums being disposed in horizontal spaced relation with respect to each other, an endless belt operating over said vertical drums, the side faces of said belt being disposed vertically, inclined blades having substantially wide central portions secured to the outer surface of said belt, portions of said blades beyond the wide central portions thereof being free of said belt, and mechanism for transmitting rotary movement of said power shaft to one of said drums moving said belt and blades in a direction transversely of the path of travel of said mower and snow plow attachment through the snow.

2. The combination with a motor mower and the vertical power shaft thereof, of a snow plow attachment comprising a frame embodying a wide forward scraping blade, wide upper arms extending laterally from one edge of said blade, said arms having openings elongated longitudinally of said arms, lower arms having elongated openings positioned under said wide arms, brackets secured to the frame of the mower, said brackets having transversely elongated openings, said upper and lower arms being disposed on opposite sides of said bracket, the elongated openings of said arms aligning with the openings of said bracket, bolts disposed in said aligning openings adjustably securing said arms and snow plow attachment to said mower frame, vertical drums mounted on the snow plow frame, an endless belt operating over said drums, vertical snow engaging blades secured to and extending laterally from said belt for contact with snow into which the snow plow is directed, and mechanism for transmitting motion of said power shaft to one of said drums, operating said drums and blades.

3. The combination with a motor mower and the vertical power shaft thereof, of a snow plow embodying a frame, means for removably mounting said snow plow on the frame of said mower, vertical drums mounted on the forward end of said snow plow frame in horizontal spaced relation with respect to each other, a wide belt having its side surfaces disposed vertically, operating over said drums, vertically disposed blades secured to the outer surface of said belt and projecting outwardly therefrom, and mechanism for transmitting power from said power shaft to said drums and belt, rotating said belt and blades in horizontal planes.

4. The subject matter as claimed in claim 3, and a stationary blade mounted on said snow plow frame operating in advance of said blades adapted to direct snow to said blades.

5. The combination with a motor mower and the vertical power shaft thereof, of a snow plow attachment embodying a frame removably mounting said snow plow attachment on said mower, spaced horizontal arms forming a part of the snow plow frame, a wide blade connecting the arms at their forward ends, means for adjustably attaching said arms to the frame of said mower, vertical drums mounted on said arms, a belt operating over said drums, vertical blades secured to said belt intermediate the ends of the blades only, said blades extending outwardly from said belt for contact with a snow bank into which the snow plow is directed, and means for transmitting power from said power shaft to said drums rotating said drums and belt.

6. The combination with a motor mower and the vertical power shaft thereof, of a snow plow embodying a frame, said frame including a wide forward scraping blade, brackets secured to the motor frame, means for securing said arms to said brackets for adjustment forwardly and laterally, with respect to the mower frame, vertical drums mounted on said snow plow frame adjacent to said blade, an endless belt operating between said drums, outwardly extended vertical blades secured to the outer surface of said belt, for contact with snow into which said snow plow is directed, and mechanism for transmitting power from said power shaft to drums operating said drums and belt.

References Cited in the file of this patent
UNITED STATES PATENTS

| | | |
|---|---|---|
| 2,402,976 | Olson | July 2, 1946 |
| 2,566,724 | Heil | Sept. 4, 1951 |
| 2,747,306 | Hasenbuhler | May 29, 1956 |